United States Patent [19]

Fallon et al.

[11] 4,045,717
[45] Aug. 30, 1977

[54] BATTERY CHARGER

[75] Inventors: William H. Fallon, Parma; William R. Schober, Avon Lake, both of Ohio

[73] Assignee: General Battery Corporation, Reading, Pa.

[21] Appl. No.: 676,475

[22] Filed: Apr. 13, 1976

Related U.S. Application Data

[63] Continuation of Ser. No. 559,159, March 17, 1975, abandoned.

[51] Int. Cl.² .......................... H02J 7/02; G05F 1/12
[52] U.S. Cl. ........................................ 320/2; 320/23; 320/59; 323/44 R
[58] Field of Search ................. 320/9, 22, 23, 39, 40, 320/56, 2; 323/45, 44 R, 9; 321/16, 68

[56] References Cited

U.S. PATENT DOCUMENTS

| | | | |
|---|---|---|---|
| 2,996,656 | 8/1961 | Sola | 323/45 |
| 3,843,918 | 10/1974 | Rhyne | 320/39 X |

Primary Examiner—Robert J. Hickey
Attorney, Agent, or Firm—Benasutti Associates, Ltd.

[57] ABSTRACT

In a battery charging circuit for charging a battery load characterized by having a substantial effective capacitance, a transformer is connected in a Scott T configuration, the transformer input being adapted for connection to a three phase power line, and the transformer output circuit being in a four phase star configuration for providing a four phase charging circuit. The transformer additionally contains a pair of ferroresonant circuits, each such circuit containing a capacitance selected to cooperate with the capacitance of the battery so as to provide the desired charging characteristic.

2 Claims, 2 Drawing Figures

BATTERY CHARGER

This is a continuation of application Ser. No. 559,159 filed Mar. 17, 1975, now abandoned.

BACKGROUND OF THE INVENTION

1. Field of the Invention

This invention lies in the field of battery chargers and, more particularly, chargers utilizing transformers with ferroresonant circuits.

2. Description of the Prior Art

In the present industrial market, there is a very strong demand and need for battery charging equipment which is relatively simple and inexpensive, but reliable and capable of charging battery loads with a desired battery characteristic. The basic approach to providing such a battery charging circuit is to design a transformer and output rectifying circuit which transforms three phase power and provides it in rectified form across the battery terminals, the battery itself acting as an effective filter. Available equipment does, and has done, this job for a number of years, but there remains a need for improving the charging characteristics of such chargers, and also improving their reliability, while simultaneously reducing construction costs.

SUMMARY OF THE INVENTION

It is an object of this invention to provide a battery charger of simplified construction compared to the prior art, which is relatively inexpensive, and reliable, and which provides a charging characteristic which is stable within predetermined limits for the entire range of battery loads for which it is used.

In accordance with the above objective, there is provided a battery charging circuit adapted for connection to a three phase line, and for use with a battery load having a substantial effective capacitance, having a transformer connected in a Scott T configuration with a pair of ferroresonant circuits each in magnetic association with an output winding, and each such ferroresonant circuit comprising a capacitance selected to cooperate with the effective capacitance of the battery load. The output of the transformer is connected in a four phase star configuration to the battery.

DESCRIPTION OF THE PREFERRED EMBODIMENT

Figure 1:
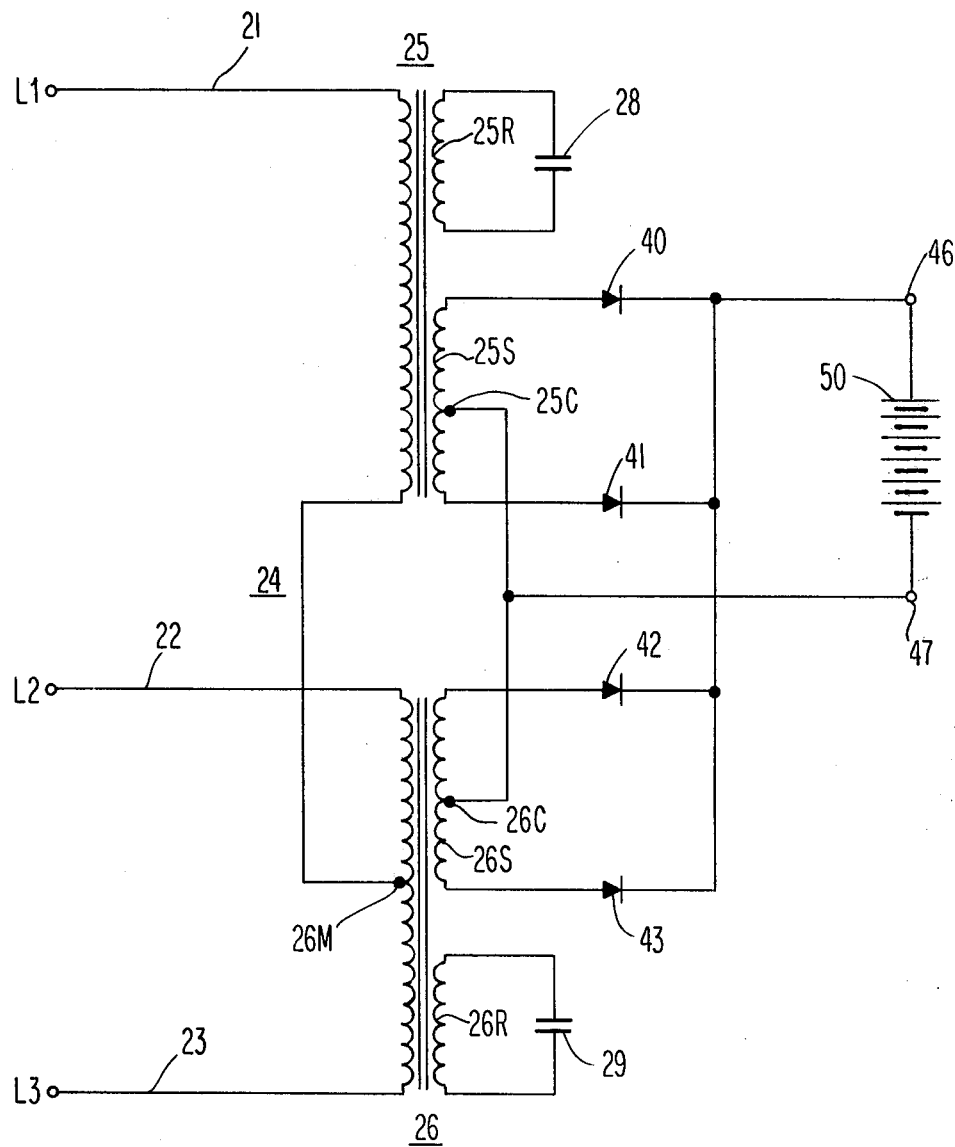
FIG. 1 is a circuit diagram showing the charging circuit of this invention.

Referring to FIG. 1, there is shown a circuit diagram of the battery charger of this invention. Lines 21, 22 and 23 are connected between a three phase power line comprised of L1, L2 and L3, and the primary windings of a Scott T connected transformer 24. As seen in FIG. 1, the transformer has two sections, 25 and 26, comprising two input windings, with the end of one input winding connected, at point 26M, to the center of the other input winding. Transformer 24 has four secondary windings, 25S and 25R, and 26S and 26R. Windings 25S and 26S are secondary output windings, each of which is center tapped at 25C and 26C, the two center taps being connected together. Diodes 40, 41, 42 and 43 are connected to respective ends of windings 25S and 26S, in a four phase star configuration. The cathodes of the four diodes are coupled together and connected to output terminal 46. The common connection of the center taps is connected to output terminal 47. The battery load 50 is placed between terminals 46 and 47 for charging.

Output windings 25R and 26R ar physically positioned with respect to windings 25S and 26S respectively, to that the currents through 25R and 26R cause some saturation in transformers 25 and 26 respectively, so as to provide a degree of regulation to line voltage variation. Across winding 25R is placed a capacitance 28, the winding 25R and capacitance 28 forming a resonant circuit which carries a capacitive load, i.e. capacitive volt amperes. Likewise, winding 26R and capacitor 29 form a path for capacitive volt amperes. These arrangements constitute a ferroresonant transformer circuit which provides the desired taper characteristic or charging characteristic for recharging the battery load 50. The capacitor 28 and 29 may either be integrated within the winding of the ferroresonant transformer, or mechanically integrated as part of the transformer. The desired magnetic conduction path through the transformer may be obtained either by conventional interleaving construction, or by the use of butt stacking.

Figure 2:
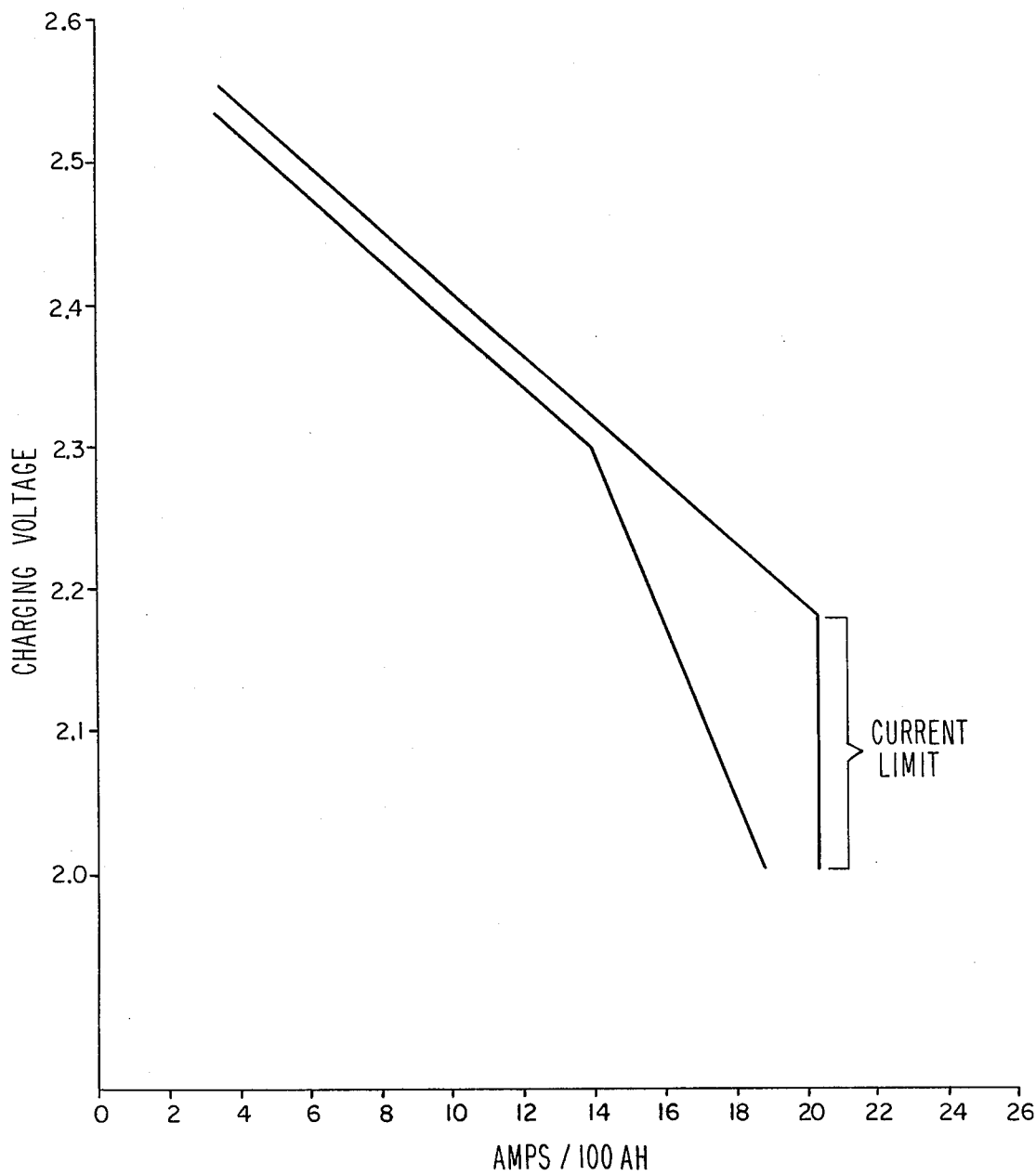
FIG. 2 is a graph showing typical limits within which the charging characteristic for the battery charger of this invention is found.

Referring now to FIG. 2, there are shown curves representing typical limits of the charging characteristic of the battery charger of this invention. The curves shown are per unit curves, the Y axis representing charging volts per cell, and the X axis representing charging amperes per 100 amp hour capacity of the battery being charged. By way of example, if a 500 amp hour (AH) battery is charged by a battery charger in accordance with FIG. 2, when the volts per cell was at 2.3, the charging current would be between 70 amps and 75 amps. It is noted that for this typical charging characteristic the start rate is limited to about 20.4 amps per 100 AH, whereas when the volts per cell has reached about 2.52 volts, the charging current is reduced to between 4 and 5 amps per 100 AH. The saturation effect contributed by the ferroresonant circuit is a prime determinant of the current limiting portion of the charging characteristic.

The efficiency and reliability of the charger of this invention is to be appreciated in comparison with a conventional three phase transformer type charging circuit. In this circuit of this invention, only two transformer sections are required, instead of three, each transformer handling about 1.5 times the KVA of the normal three phase transformer section. This design, in allowing two transformers instead of three, makes possible a savings in the amount of labor, as well as savings in the number of diodes, since only four diodes are necessary instead of six. The arrangement also contributes to increased reliability, because of the reduced number of components, both transformer components and diodes.

In addition to the above, a substantial improvement is appreciated in the size of the external capacitors 28 and 29 required for the ferroresonant circuit. In the Scott T four phase star configuration of this invention, the effective capacitance of the battery load 50 is reflected into the transformer circuit, thereby reducing the amount of external capacitance which needs to be connected to the circuit in order to obtain the desired operating conditions. It is well known that batteries, from a circuit viewpoint, constitute large capacitive loads. However, in a conventional three phase diode bridge output configuration, the capacitive load is not sensed at the secondary windings as it is with the four phase star configuration of the invention.

To illustrate the difference, a test comparison was made, using a conventional three phase configuration and the Scott T four phase star configuration of this invention. In both configurations, the charging circuits were designed to give substantially the same charging curve for a six cell 540 AH lead acid battery. Also, in both configurations, the voltage across the output winding of each ferroresonant circuit was about 400 volts. It was found that with the conventional three phase configuration, each capacitor in each ferroresonant circuit was requied to be within the range of 12-16 microfarads. By contrast, with the four phase star configuration, each of the two external capacitors 28 and 29 was required to be only 7.5 microfarads. Thus, it is seen that in the circuit of this invention a substantial improvement is achieved and smaller capacitors can and must be utilized, resulting in a decrease in cost and an increase in reliability. Further, since the capacitors are smaller, the capacitor volt amperes carried in the windings are smaller, such that the required wire size can be smaller. This is another source of cost reduction derived from the arrangement of this invention.

In practice, the charger of this invention is designed by connecting the two transformer sections in a Scott T configuration, and then selecting the capacitors for the ferroresonant circuit so that the resulting charging characteristic is within the design limits. If the selected capacitor is too large, corresponding to a given winding voltage in a ferroresonant circuit, the charging current is too high throughout the charging range. Conversely, if the capacitance of the selected capacitor is too low, the charging current is too little, such that regulation becomes a problem and the charging circuit requires much too great a time to achieve the desired charge on the battery load. The selection of the ferroresonant capacitors is made with an effective load 50 across terminals 46 and 47, so that capacitors 28 and 29 are chosen to cooperate with the effective capacitence of the load.

It is to be noted that, while the circuit diagrammed in FIG. 1 shows simply a single arrangement for connection to a power line, a dual voltage arrangement for connection to either a high voltage or low voltage line is also within the scope of this invention.

What is claimed is:

1. A battery charging circuit for charging a battery having an effective load capacitance, said circuit having a charging characteristic within predetermined limits, said characteristic being a functional dependence of charging voltage on amperes per predetermined unit of ampere hours, and said characteristic being substantially independent of the size of said battery, which charging circuit further comprises:
   a. a pair of transformers connected in Scott-T configuration;
   b. an input connecting means for connecting said transformer to a three phase line;
   c. an output connecting means for connection to a first terminal of said battery comprising a separate secondary output winding and rectifier circuit, for each of said transformers;
   d. a ferroresonant output circuit means associated with each of said transformers for normally maintaining said transformers in saturation, and for cooperating with said output connecting means to provide said charging characteristic, said means comprising a further transformer secondary winding with only a capacitance connected thereacross, said capacitance predetermined in combination with said effective load capacitance to maintain said charging characteristic within said predetermined limits.

2. A method of providing a battery charging circuit for charging a battery load having an effective capacitance, said charging circuit being characterized by having a charging curve within predetermined limits, comprising:
   a. connecting a pair of transformers in a Scott-T configuration, each of said transformers having a primary input winding, and a pair of secondary output windings;
   b. connecting said input windings to terminals adapted for connection to a three phase power line;
   c. connecting a first one of said secondary output windings from each of said transformers to a rectifier circuit;
   d. connecting said rectifier circuit to said battery load terminals, said battery load having said effective capacitance;
   e. connecting across a further of said secondary output windings on each of said transformers only a capacitance, which cooperates with said effective capacitance so as to provide a charging curve within said predetermined limits; and
   f. removing said load from said battery load terminals.

* * * * *